(12) United States Patent
Maeng et al.

(10) Patent No.: US 10,025,333 B2
(45) Date of Patent: Jul. 17, 2018

(54) MIXED SIGNAL LOW DROPOUT VOLTAGE REGULATOR WITH LOW OUTPUT IMPEDANCE

(71) Applicant: Intel Corporation, Santa Clara, CA (US)

(72) Inventors: Moonkyun Maeng, El Dorado Hills, CA (US); Aaron Martin, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 281 days.

(21) Appl. No.: 14/638,928

(22) Filed: Mar. 4, 2015

(65) Prior Publication Data

US 2016/0259354 A1 Sep. 8, 2016

(51) Int. Cl.
*G06F 1/00* (2006.01)
*G06F 1/26* (2006.01)
*G06F 1/32* (2006.01)
*G05F 1/575* (2006.01)

(52) U.S. Cl.
CPC ............... *G05F 1/575* (2013.01); *G06F 1/26* (2013.01)

(58) Field of Classification Search
CPC ....................................................... G06F 1/32
See application file for complete search history.

(56) References Cited

U.S. PATENT DOCUMENTS

| 6,346,831 | B1 * | 2/2002 | Krishnamurthy | H03K 19/0963 326/105 |
|---|---|---|---|---|
| 2005/0218871 | A1 * | 10/2005 | Kang | G05F 1/40 323/265 |
| 2009/0033298 | A1 * | 2/2009 | Kleveland | G05F 1/575 323/271 |
| 2009/0051431 | A1 * | 2/2009 | Dabag | H03F 1/52 330/255 |
| 2010/0066438 | A1 * | 3/2010 | Siprak | H01L 21/761 327/535 |
| 2010/0188057 | A1 * | 7/2010 | Tarng | H03B 5/04 323/225 |
| 2011/0254669 | A1 * | 10/2011 | Dixit | G01B 31/31854 340/309.9 |
| 2012/0032655 | A1 * | 2/2012 | Ramaraju | G11C 5/147 323/268 |
| 2013/0307506 | A1 * | 11/2013 | Oh | G05F 1/10 323/282 |
| 2014/0119573 | A1 * | 5/2014 | Kropfitsch | H03F 1/086 |
| 2015/0244393 | A1 * | 8/2015 | Kabir | H03M 3/488 341/143 |

* cited by examiner

*Primary Examiner* — Mohammed Rehman
(74) *Attorney, Agent, or Firm* — Green, Howard & Mughal LLP (57) ABSTRACT

Described is an apparatus which comprises: a first feedback loop to generate a control signal for regulating an output voltage provided to a load; and a second feedback loop, separate from the first feedback loop, to receive the control signal from the first feedback loop, the second feedback loop to regulate the output voltage provided to the load.

20 Claims, 5 Drawing Sheets

MIXED SIGNAL LOW DROPOUT VOLTAGE REGULATOR WITH LOW OUTPUT IMPEDANCE

BACKGROUND

Low dropout (LDO) voltage regulator (VR) is used to regulate a power supply to a load according to changes in load conditions. A typical LDO VR consists of a p-type transistor with a source terminal coupled to a node that provides an input power supply, a drain terminal coupled to the load to provide the regulated power supply, and a gate terminal controllable by a comparator or amplifier. Here, the comparator or amplifier compares the power supply provided to the load against a reference voltage, and generates a control signal to control the gate terminal of the p-type transistor.

However, during active operation of the load (e.g., high switching of nodes in the load), high frequency current spikes are observed on the power supply provided by the LDO VR. It is a challenge to regulate the power supply for these high frequency current spikes (e.g., current spikes at 1 GHz) as well as for low frequency switching noise (e.g., switching noise at 1 MHz) on the power supply using the typical LDO VR.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

DETAILED DESCRIPTION

Some embodiments describe a hybrid voltage regulator (VR) which is operable to regulate power supply provided to a load via at least two feedback loops—first and second feedback loops. In some embodiments, the first feedback loop is a digital feedback loop (i.e., an electrical path in a loop having circuits that are substantially digital circuits) which is used to generate a control voltage for one or more analog drivers (also referred to here as analog buffers or high-frequency analog feedback circuits). In some embodiments, the second feedback loop is an analog feedback loop (i.e., a circuit having an electrical path in a loop form through analog devices). In some embodiments, the analog feedback loop comprises a Flipped Voltage Follower (FVF) which drives current to the load. In some embodiments, the analog feedback loop is local to an analog driver.

Here, the term "hybrid" VR generally refers to a mixed signal VR that regulates the power supply using both analog circuits and digital circuits. For example, the hybrid VR includes a digital feedback loop and a separate analog feedback loop to regulate the power supply, where the digital feedback loop regulates the power supply using substantially digital circuits coupled in an electrical loop, and where the analog feedback loop regulates the power supply using analog circuits such as FVF.

In some embodiments, the low frequency variations (e.g., variations that are less than 1 MHz) to the power supply are compensated by the first feedback loop while the high frequency variations (e.g., variations that are 1 GHz or more) to the power supply are compensated by the second feedback loop. For example, changes to the power supply due to temperature and/or process variations are low frequency variations and are compensated by the digital feedback loop. In some embodiments, the high frequency variations to the power supply are compensated by the second feedback loop. For example, changes to the power supply due to high frequency switching in the load are compensated by the analog feedback loop.

In some embodiments, multiple analog drivers (that are part of the analog feedback loops) are provided which operate using the control signal generated by the digital feedback loop. In some embodiments, the multiple analog drivers are coupled in parallel to one another such that the drive strength of the hybrid VR can be adjusted by turning on/off some number of analog drivers to address variations to the power supply. In some embodiments, the digital feedback loop forms a master loop that provides the control signal to one or more slave drivers (e.g., FVF circuits), where the slave drivers provide corresponding power supplies to different loads.

There are many technical effects of various embodiments. For example, the embodiments provide a VR which can provide a regulated voltage to a load even when the load current switches over a large current range (e.g., from 100 µA to 100 mA) and over a wide frequency range (e.g., 2 MHz to 5 GHz). The hybrid VR can be configured to have a master loop and one or more slave drivers. As such, the hybrid VR provides a VR architecture that can provide multiple different power supplies to different loads depending on their respective loading conditions. The hybrid VR can also be modeled easily by hardware description languages (such as Verilog), which helps in formal verification of the logic having the hybrid VR.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct electrical, magnetic, mechanical, or wireless connection between the things that are connected, without any intermediary devices. The term "coupled" means either a direct electrical, magnetic, mechanical, or wireless connection between the things that are connected or an indirect electrical, magnetic, mechanical, or wireless connection through one or more passive or active intermediary devices. The term "circuit" means one or more passive and/or active components that are arranged to cooperate with one another to provide a desired function. The term "signal" means at least one current signal, voltage signal, magnetic signal, electromagnetic signal, or data/clock signal. The meaning of "a," "an," and "the" include plural references. The meaning of "in" includes "in" and "on."

The terms "substantially," "close," "approximately," "near," and "about," generally refer to being within +/−20% of a target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

For purposes of the embodiments, the transistors in various circuits and logic blocks described here are metal oxide semiconductor (MOS) transistors, which include drain, source, gate, and bulk terminals. The transistors also include Tri-Gate and FinFET transistors, Gate All Around Cylindrical Transistors, Tunneling FET (TFET), Square Wire, or Rectangular Ribbon Transistors or other devices implementing transistor functionality like carbon nano tubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bipolar junction transistors—BJT PNP/NPN, BiCMOS, CMOS, eFET, etc., may be used without departing from the scope of the disclosure. The term "MN" indicates an n-type transistor (e.g., NMOS, NPN BJT, etc.) and the term "MP" indicates a p-type transistor (e.g., PMOS, PNP BJT, etc.).

Figure 1:
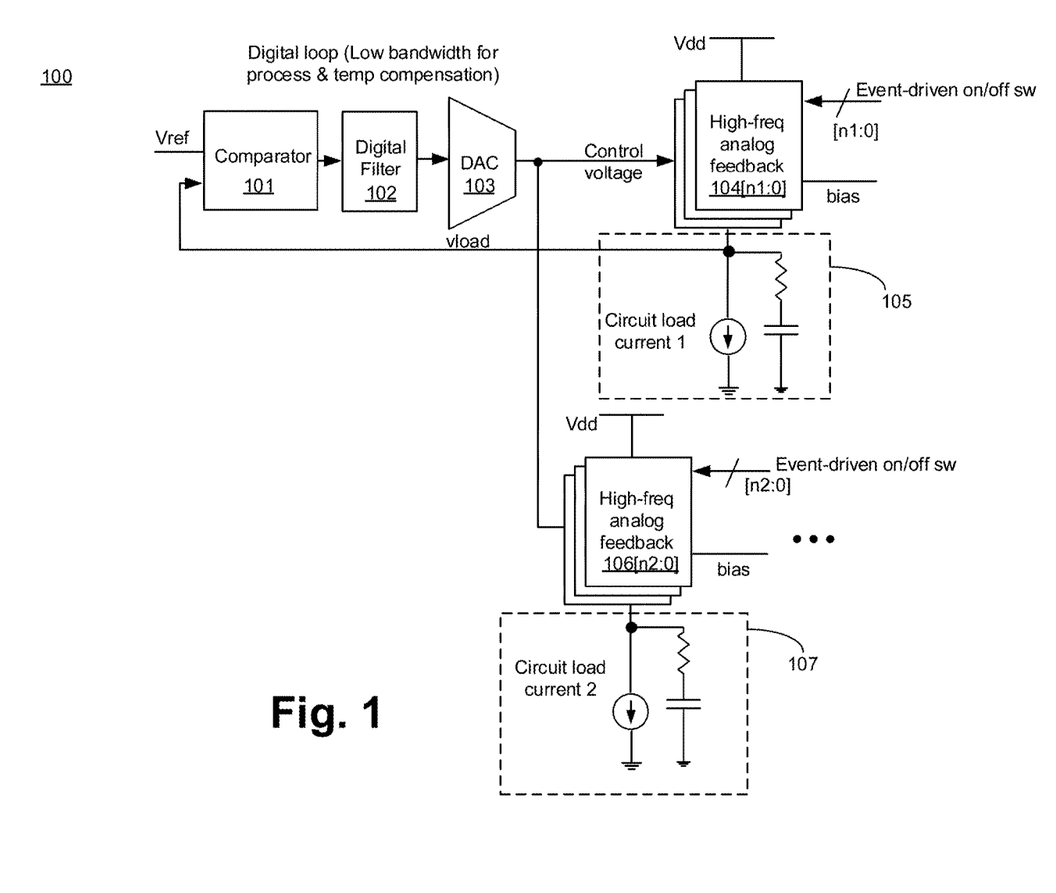
FIG. 1 illustrates a hybrid voltage regulator (VR), according to some embodiments of the disclosure.

FIG. 1 illustrates hybrid VR architecture 100, according to some embodiments of the disclosure. In some embodiments, architecture 100 comprises a digital feedback loop including Comparator 101, Digital Filter 102, and Digital-to-Analog Converter (DAC) 103. In some embodiments, architecture 100 comprises an analog feedback loop 104. The term "digital feedback loop" generally refers to an electrical path that encompasses any combination of suitable components that generate a control voltage, mostly by circuits classified as digital circuits in the technical sense, which is used for low frequency regulation of vload. In some embodiments, the digital feedback loop (also referred to here as the master loop) is an electrical path having a loop including Comparator 101, Digital Filter 102, DAC 103, and a circuit path from the Control voltage node to vload, where vload is the node providing regulated power supply load 105 generated from the base input supply Vdd. Here, load 105 is modeled as a current sink coupled in parallel to a resistor-capacitor network. Load 105 can be any load. For example, load 105 is a processor core, a portion of the processor core, cache memory, or any other suitable circuit needing regulated power supply.

In some embodiments, the analog feedback loop is local to High-frequency analog feedback circuits 104 and separate from the digital feedback loop. The term "analog feedback loop" generally refers to an electrical path that encompasses any combination of suitable components that are used for high-frequency regulation of vload using the Control voltage, where the electrical bath comprises mostly of circuits classified as analog circuits in the technical sense. In some embodiments, the analog feedback loop reduces the output impedance (as seen from the vload node to High-frequency analog feedback circuit 104) to speedily compensate for the high frequency current noise on the vload node. Here, the terms for signal and node are interchangeably used. For example, vload may refer to vload signal or power supply, or it may refer to the node vload depending on the context of the sentence.

In some embodiments, multiple High-frequency analog feedback circuits are coupled together in parallel and controllable by Event-driven on/off switch (sw) signal(s). In this example, "n1+1" High-frequency analog feedback circuits are shown coupled in parallel and controllable by "n1+1" bits of Event-driven on/off sw signal(s), where "n1" is an integer which is '1' or more. In some embodiments, Event-driven on/off sw signal(s) are provided by a power management unit or an operating system.

For example, depending on the loading conditions of load 105, the power management unit or operating system may turn on/off High-frequency analog feedback circuits (which are analog drivers) to provide the demanded power. In some embodiments, when load 105 is fully active, the power management unit or operating system enables all or most of the analog drivers 104. In some embodiments, when load 105 is inactive (e.g., in a power saving mode) then at least one analog driver 104 (e.g., High-frequency analog feedback[0]) is enabled to drive, by the Event-driven on/off sw signal.

In some embodiments, one or more bias signals (here collectively shown as "bias") are used to bias one or more transistors of High-frequency analog feedback circuits 104 [n1:0]. In some embodiments, the one or more bias signals are generated by a digital-to-analog converter (not shown). In some embodiments, the one or more bias signals are generated by a resistor divider network. In other embodiments, the one or more bias signals may be generated by other sources such as a band-gap reference circuit. Any suitable bias generator may be used to generate the one or more bias signals. In some embodiments, the analog feedback loop is local to High-frequency analog feedback circuits 104[n1:0] and separate from the digital feedback loop. Various embodiments of the analog feedback loops are described with reference to FIGS. 2-3.

Referring back to FIG. 1, in some embodiments, Comparator 101 compares a DC reference voltage (Vref) with vload, and outputs a digital signal representing whether the voltage level of vload is higher or lower than Vref. In some embodiments, Comparator 101 is a clocked comparator that updates its output periodically according to a frequency of the clock signal (not shown). Any suitable circuit for comparing two voltages and generating a digital output can be used for implementing Comparator 101.

In some embodiments, the output of Comparator 101 is filtered by Digital Filter 102. In some embodiments, Digital Filter 102 is a counter that counts for a predetermined (or programmable) number of cycles before outputting the output of Comparator 101. If the output of Comparator 101 changes before the counter of Digital Filter 102, the counter is reset and the output of Digital Filter 102 remains unchanged. In some embodiments, Digital Filter 102 is implemented as a shift register chain. Any suitable circuit for filtering the output of Comparator 101 can be used for implementing Digital Filter 102.

In some embodiments, DAC 103 converts the digital output of Digital Filter 102 to a corresponding analog signal (i.e., the Control voltage signal). In some embodiments, DAC 103 is an 8-bit DAC to generate 256 analog voltage levels for the Control voltage. In other embodiments, other resolutions for the DAC may be used. Any suitable DAC circuit may be used to implement DAC 103. In some embodiments, Digital Filter 102 is optional and its function can be implemented within Comparator 102 and/or DAC 103. While various components of the digital feedback loop are shown as separate blocks, they can be integrated in fewer or more blocks.

In some embodiments, the digital feedback loop forms a master loop that provides the Control voltage to one or more slave drivers 106[n2:0] (e.g., FVF circuits), where "n2" is an integer. Here, slave drivers 106[n2:0] (also referred to here as analog drivers) provide corresponding power supplies to different loads. For example, slave driver 106[0] provides power supply to load 107 (which is modeled here similarly to load 105). Load 107 can be any load. For example, load 107 is a processor core, a portion of the processor core, cache memory, or any other suitable circuit needing regulated power supply. In some embodiments, slave drivers 106[n2:0] (also to referred here as multiple High-frequency analog feedback circuits) are coupled together in parallel and controllable by Event-driven on/off switch (sw) [n2:0] signals.

In this example, "n2+1" High-frequency analog feedback circuits are shown coupled in parallel and controllable by "n2+1" bits of Event-driven on/off sw signal(s). In some embodiments, Event-driven on/off sw signal(s) for High-frequency analog feedback circuits 106[n2:0] are provided by a power management unit or an operating system. For example, depending on the loading conditions of load 107, the power management unit or operating system may turn on/off High-frequency analog feedback circuits (which are analog drivers) to provide the demanded power. When load 107 is fully active, the power management unit or operating system enables all or most of analog drivers 106. In some embodiments, when load 107 is inactive (e.g., in a power saving mode) then at least one analog driver 106 (e.g., High-frequency analog feedback[0]) is enabled to drive, by the Event-driven on/off sw signal.

Figure 2:
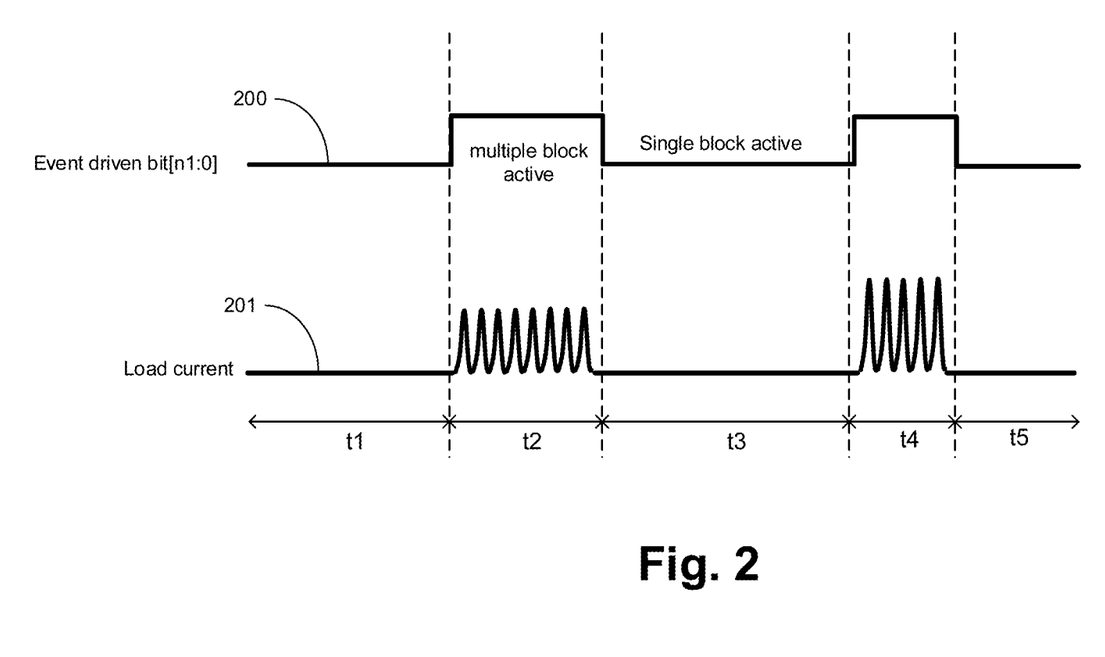
FIG. 2 illustrates waveforms of low and high frequency load switching operation and corresponding setting of an analog driver strength of the hybrid VR, according to some embodiments of the disclosure.

FIG. 2 illustrates waveforms 200 and 201 of the low and high frequency load switching operations and corresponding setting of analog driver strength of the hybrid VR, according to some embodiments of the disclosure. It is pointed out that those elements of FIG. 2 having the same reference numbers (or names) as the elements of any other figure can operate or function in any manner similar to that described, but are not limited to such. Here, x-axis is time and y-axis for waveform 200 is voltage while y-axis of waveform 201 is current. Waveform 200 illustrates a scenario of turning on/off the Event drive bit (same as Event-driven on/off sw signal). Waveform 201 illustrates load current (flowing through node vload) for different loading conditions of load 105.

During time t1, load current 201 is flat indicating low or no activity by load 105. As such, Event driven bits [n1:0] are set such that at least one analog driver 104 is enabled (e.g., High-frequency analog feedback 104[0] is enabled by Event driven bit[0]) while other analog drivers are turned off because there is no demand for higher current by load 105. During time t2, load current 201 shows current spikes indicating high activity in load 105. To compensate for the high frequency current spikes, more analog drivers are turned on by the Event driven bits, according to some embodiments.

During time t3, load 105 becomes inactive (e.g., enters into a low power state). As such, at least one analog driver is turned on while others are turned off. During time t4, load 105 becomes very active with higher magnitude of current spikes than the magnitude of current spikes during time t2. To compensate for these current spikes, more or all analog drivers are turned on by the Event driven bits. During time t5, load 105 again becomes inactive and so the power management unit or the operating system sets the Event driven bits such that at least one of the analog drivers is turned on (or enabled) while other analog drivers are disabled.

Figure 3:
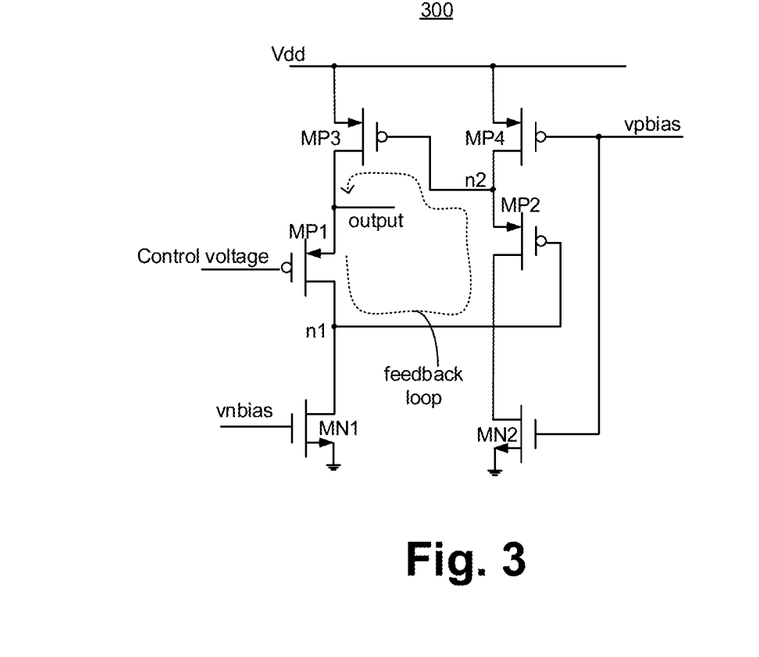
FIG. 3 illustrates a Flipped Voltage Follower (FVF) circuit of the hybrid VR having an analog feedback loop for compensating for high frequency noise on the power supply, according to some embodiments of the disclosure.

FIG. 3 illustrates a FVF circuit 300 of the hybrid VR having an analog feedback loop for compensating high frequency noise on the power supply, according to some embodiments of the disclosure. It is pointed out that those elements of FIG. 3 having the same reference numbers (or names) as the elements of any other figure can operate or function in any manner similar to that described, but are not limited to such.

In some embodiments, FVF 300 comprises n-type transistors MN1 and MN2, and p-type transistors MP1, MP2, MP3, and MP4 coupled together as shown. In some embodiments, transistor MN1 is biased by vnbias. In some embodiments, transistors MP4 and MN2 are biased by vpbias. In some embodiments, transistor MN2 is biased such that the dynamic range of stable operation of FVF increases. Here, vnbias and vpbias are collectively represented by the bias signal in FIG. 1.

Referring back to FIG. 3, in some embodiments, transistor MP1 receives the Control voltage from DAC 103. In some embodiments, transistor MP2 is biased by the voltage on node n1. In some embodiments, transistor MP3 is biased by the voltage on node n2. Here, the analog feedback loop, referred with reference to various embodiments, is the electrical loop indicated by the dotted line. In some embodiments, the size (W/L) of transistors MP3 and MP4 is larger than the size of transistors MP1 and MP2. The configuration of FVF 300 allows for node n1 to provide high impedance while the output node provides low impedance. As such, a higher phase margin (PM) is achieved by FVF 300 compared to other known voltage followers. A higher PM translates to more stability for FVF 300 across a broad current range.

In some embodiments, the analog feedback loop reduces the output impedance by 1/(1+loopgain), where "loopgain" is the gain of the analog loop. As such, the overall impedance seen from the output port back to FVF 300 is approximately (Rds∥1/gm)/(1+loopgain), where "Rds" is the source-drain resistance of MP3 and "gm" is the trans-conductance of MP1. In some embodiments, the second pole of FVF 300 is moved to a higher frequency (compared to the second pole of known voltage followers) to assist with the stability of the local feedback loop without the need for additional stability compensation circuit.

Figure 4:
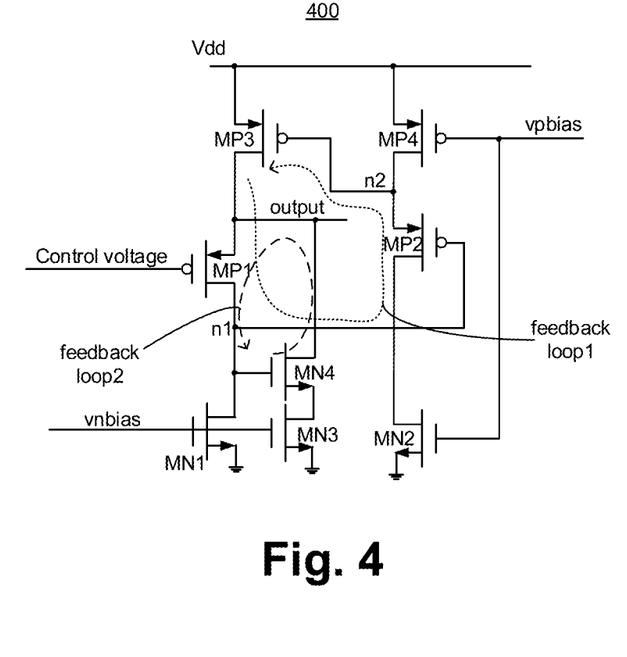
FIG. 4 illustrates a FVF circuit of the hybrid VR, according to some embodiments of the disclosure.

FIG. 4 illustrates FVF circuit 400 of the hybrid VR, according to some embodiments of the disclosure. It is pointed out that those elements of FIG. 4 having the same reference numbers (or names) as the elements of any other figure can operate or function in any manner similar to that described, but are not limited to such. So as not to obscure the various embodiments, differences between FVF circuit 300 and FVF circuit 400 are described.

In some embodiments, FVF circuit 400 includes additional n-type transistors MN3 and MN4 coupled together as shown. In some embodiments, the gate terminal of transistor MN4 is biased by the voltage on node n1. In some embodiments, the gate terminal of transistor MN3 is biased by vnbias, where transistors MN3 and MN4 are coupled in series. In some embodiments, the drain terminal of transistor MN4 is coupled to the output node. In some embodiments, FVF circuit 400 provides an additional feedback loop formed by transistors MP1 and MN4. This additional feedback loop further increase the output dynamic range and reduces the output impedance of the FVF.

Figure 5:
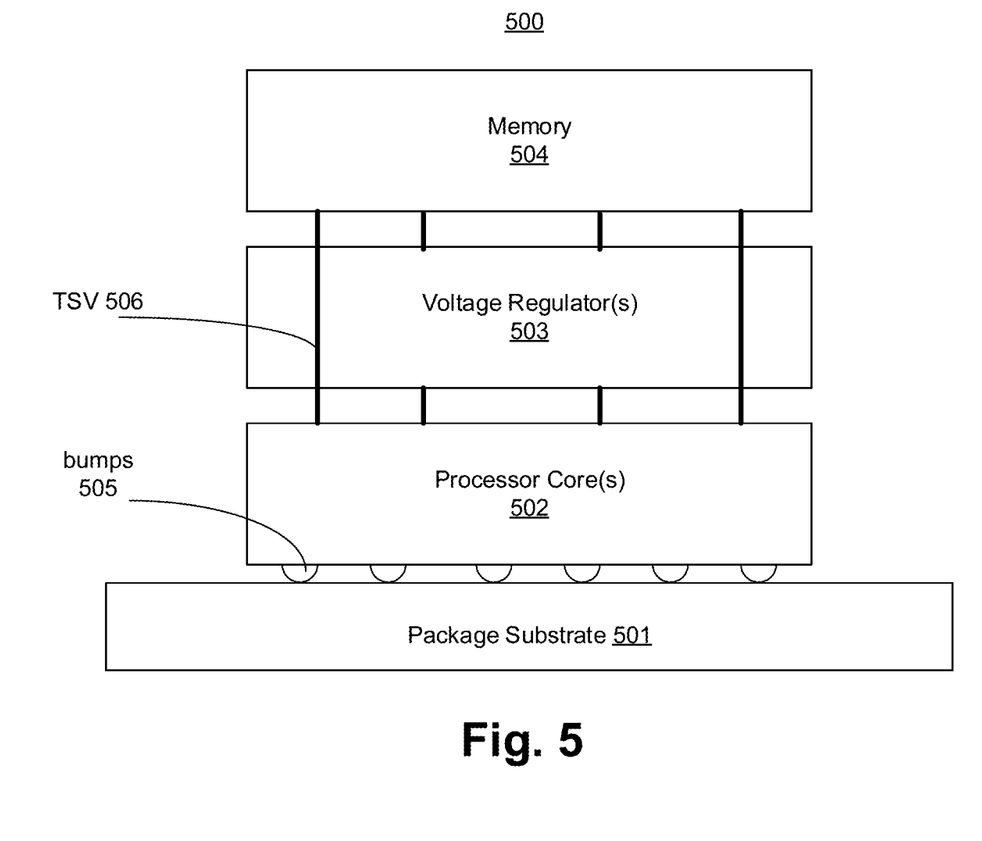
FIG. 5 illustrates a three dimensional (3D) Integrated Circuit (IC) having one or more hybrid VRs, according to some embodiments of the disclosure.

FIG. 5 illustrates a three dimensional (3D) Integrated Circuit (IC) 500 having the one or more hybrid VRs, according to some embodiments of the disclosure. It is pointed out that those elements of FIG. 5 having the same reference numbers (or names) as the elements of any other figure can operate or function in any manner similar to that described, but are not limited to such.

In some embodiments, 3D IC 500 comprises Package Substrate 501, Processor die 502 having one or more Processor Cores, VR die 503, Memory die 504, bumps 505 for coupling Processor die 502 to Package Substrate 501. Here, VR die 503 may include the hybrid VR as described with reference to the various embodiments. The loads to the hybrid VR may be Processor Cores(s) 502 and/or Memory 504. The various dies described here communicate with one another through vias 506, such as Through-Silicon-Vias (TSVs).

3D IC 500 may have more or fewer dies than shown packaged together in a single package. For example, a communications die (not shown) having an integrated antenna may also be coupled to one of the dies in 3D IC 500. The order of the dies may be different for different embodiments. For example, Memory 504 may be sandwiched between VR die 503 and Processor die 502 in some embodiments.

Figure 6:
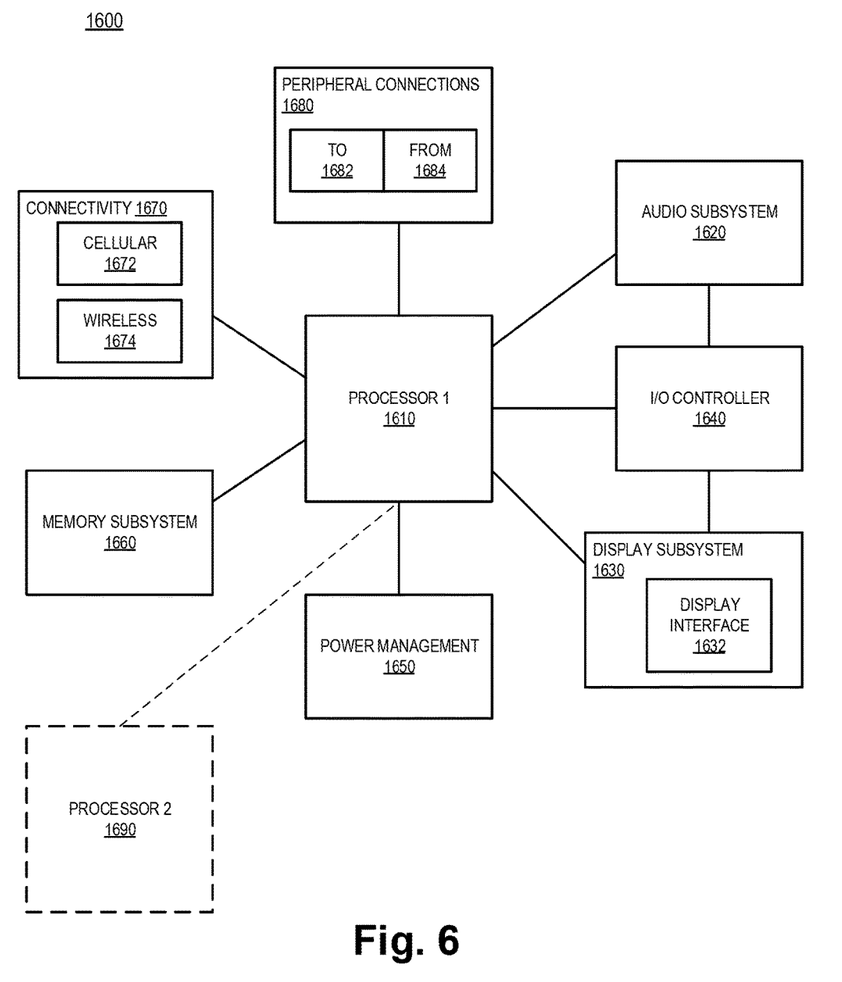
FIG. 6 illustrates a smart device or a computer system or a SoC (System-on-Chip) with the hybrid VR, according to some embodiments.

FIG. 6 illustrates a smart device or a computer system or a SoC (System-on-Chip) with the hybrid VR, according to some embodiments. It is pointed out that those elements of FIG. 6 having the same reference numbers (or names) as the elements of any other figure can operate or function in any manner similar to that described, but are not limited to such.

FIG. 6 illustrates a block diagram of an embodiment of a mobile device in which flat surface interface connectors could be used. In some embodiments, computing device 1600 represents a mobile computing device, such as a computing tablet, a mobile phone or smart-phone, a wireless-enabled e-reader, or other wireless mobile device. It will be understood that certain components are shown generally, and not all components of such a device are shown in computing device 1600.

In some embodiments, computing device 1600 includes a first processor 1610 with the hybrid VR, according to some embodiments discussed. Other blocks of the computing device 1600 may also include one or more hybrid VRs, according to some embodiments. The various embodiments of the present disclosure may also comprise a network interface within 1670 such as a wireless interface so that a system embodiment may be incorporated into a wireless device, for example, cell phone or personal digital assistant.

In some embodiments, processor 1610 (and/or processor 1690) can include one or more physical devices, such as microprocessors, application processors, microcontrollers, programmable logic devices, or other processing means. The processing operations performed by processor 1610 include the execution of an operating platform or operating system on which applications and/or device functions are executed. The processing operations include operations related to I/O (input/output) with a human user or with other devices, operations related to power management, and/or operations related to connecting the computing device 1600 to another device. The processing operations may also include operations related to audio I/O and/or display I/O.

In some embodiments, computing device 1600 includes audio subsystem 1620, which represents hardware (e.g., audio hardware and audio circuits) and software (e.g., drivers, codecs) components associated with providing audio functions to the computing device. Audio functions can include speaker and/or headphone output, as well as microphone input. Devices for such functions can be integrated into computing device 1600, or connected to the computing device 1600. In one embodiment, a user interacts with the computing device 1600 by providing audio commands that are received and processed by processor 1610.

In some embodiments, computing device 1600 comprises display subsystem 1630. Display subsystem 1630 represents hardware (e.g., display devices) and software (e.g., drivers) components that provide a visual and/or tactile display for a user to interact with the computing device 1600. Display subsystem 1630 includes display interface 1632, which includes the particular screen or hardware device used to provide a display to a user. In one embodiment, display interface 1632 includes logic separate from processor 1610 to perform at least some processing related to the display. In one embodiment, display subsystem 1630 includes a touch screen (or touch pad) device that provides both output and input to a user.

In some embodiments, computing device 1600 comprises I/O controller 1640. I/O controller 1640 represents hardware devices and software components related to interaction with a user. I/O controller 1640 is operable to manage hardware that is part of audio subsystem 1620 and/or display subsystem 1630. Additionally, I/O controller 1640 illustrates a connection point for additional devices that connect to computing device 1600 through which a user might interact with the system. For example, devices that can be attached to the computing device 1600 might include microphone devices, speaker or stereo systems, video systems or other display devices, keyboard or keypad devices, or other I/O devices for use with specific applications such as card readers or other devices.

As mentioned above, I/O controller 1640 can interact with audio subsystem 1620 and/or display subsystem 1630. For example, input through a microphone or other audio device can provide input or commands for one or more applications or functions of the computing device 1600. Additionally, audio output can be provided instead of, or in addition to display output. In another example, if display subsystem 1630 includes a touch screen, the display device also acts as an input device, which can be at least partially managed by I/O controller 1640. There can also be additional buttons or switches on the computing device 1600 to provide I/O functions managed by I/O controller 1640.

In some embodiments, I/O controller 1640 manages devices such as accelerometers, cameras, light sensors or other environmental sensors, or other hardware that can be included in the computing device 1600. The input can be part of direct user interaction, as well as providing environmental input to the system to influence its operations (such as filtering for noise, adjusting displays for brightness detection, applying a flash for a camera, or other features).

In some embodiments, computing device 1600 includes power management 1650 that manages battery power usage, charging of the battery, and features related to power saving operation. Memory subsystem 1660 includes memory devices for storing information in computing device 1600. Memory can include nonvolatile (state does not change if power to the memory device is interrupted) and/or volatile (state is indeterminate if power to the memory device is interrupted) memory devices. Memory subsystem 1660 can store application data, user data, music, photos, documents, or other data, as well as system data (whether long-term or temporary) related to the execution of the applications and functions of the computing device 1600.

Elements of embodiments are also provided as a machine-readable medium (e.g., memory 1660) for storing the computer-executable instructions (e.g., instructions to implement any other processes discussed herein). The machine-readable medium (e.g., memory 1660) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, computing device 1600 comprises connectivity 1670. Connectivity 1670 includes hardware devices (e.g., wireless and/or wired connectors and communication hardware) and software components (e.g., drivers, protocol stacks) to enable the computing device 1600 to communicate with external devices. The computing device 1600 could be separate devices, such as other computing devices, wireless access points or base stations, as well as peripherals such as headsets, printers, or other devices.

Connectivity 1670 can include multiple different types of connectivity. To generalize, the computing device 1600 is illustrated with cellular connectivity 1672 and wireless connectivity 1674. Cellular connectivity 1672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity (or wireless interface) 1674 refers to wireless connectivity that is not cellular, and can include personal area networks (such as Bluetooth, Near Field, etc.), local area networks (such as Wi-Fi), and/or wide area networks (such as WiMax), or other wireless communication.

In some embodiments, computing device 1600 comprises peripheral connections 1680. Peripheral connections 1680 include hardware interfaces and connectors, as well as software components (e.g., drivers, protocol stacks) to make peripheral connections. It will be understood that the computing device 1600 could both be a peripheral device ("to" 1682) to other computing devices, as well as have peripheral devices ("from" 1684) connected to it. The computing device 1600 commonly has a "docking" connector to connect to other computing devices for purposes such as managing (e.g., downloading and/or uploading, changing, synchronizing) content on computing device 1600. Additionally, a docking connector can allow computing device 1600 to connect to certain peripherals that allow the computing device 1600 to control content output, for example, to audiovisual or other systems.

In addition to a proprietary docking connector or other proprietary connection hardware, the computing device 1600 can make peripheral connections 1680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional element.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. For example, other memory architectures e.g., Dynamic RAM (DRAM) may use the embodiments discussed. The embodiments of the disclosure are intended to embrace all such alternatives, modifications, and variations as to fall within the broad scope of the appended claims.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process.

For example, an apparatus is provided which comprises: a first feedback loop to generate a control signal for regulating a power supply provided to a load; and a second feedback loop, separate from the first feedback loop, to receive the control signal from the first feedback loop, the second feedback loop to regulate the power supply provided to the load. In some embodiments, the first feedback loop comprises a comparator to compare the power supply with a reference voltage. In some embodiments, the first feedback loop comprises a filter to filter output of the comparator. In some embodiments, the first feedback loop comprises a digital-to-analog comparator (DAC) to convert an output of the filter to the control signal.

In some embodiments, the first feedback loop is substantially a digital feedback loop. In some embodiments, the second feedback loop is an analog feedback loop. In some embodiments, the second feedback loop comprises a flipped voltage follower. In some embodiments, response time of the second feedback loop is controllable by a digital bus. In some embodiments, the control signal is received by multiple second feedback loops.

In some embodiments, the first feedback loop is operable to compensate low-frequency current variations associated with the power supply, the low-frequency current variations generated by the load. In some embodiments, the second feedback loop is operable to regulate the output voltage to compensate high-frequency current variations associated with the power supply, the high-frequency current variations generated by the load.

In another example, a system is provided which comprises: a memory; a processor coupled to the memory, the processor comprising a voltage regulator which includes an apparatus according to the apparatus described above; and a wireless interface for allowing the processor to communicate with another device.

In another example, an apparatus is provided which comprises: a first output node to provide a first power supply to a first load; a second output node to provide a second power supply to a second load; a master loop to generate a control signal for regulating the first power supply provided to the first load; a first analog loop, separate from the master loop, to receive the control signal for regulating the first power supply provided to the first load; and a second analog loop to receive the control signal for regulating the second power supply provided to the second load.

In some embodiments, the master loop is substantially a digital feedback loop. In some embodiments, the master loop comprises: a comparator to compare the first power supply with a reference voltage; a filter to filter output of the comparator; and a digital-to-analog comparator (DAC) to convert an output of the filter to the control signal. In some embodiments, the master loop is operable to compensate for process and temperature variations in the first power supply.

In some embodiments, the master loop is operable to compensate low-frequency current variations in the first power supply, and wherein the first analog loop is operable to compensate for high-frequency switching noise in the first power supply. In some embodiments, the second analog loop is operable to regulate the second power supply to compensate high-frequency current variations associated with the second power supply, the high-frequency current variations generated by the second load.

In another example, a system is provided which comprises: a memory; a processor coupled to the memory, the processor comprising a voltage regulator which includes an apparatus according to the apparatus described above; and a wireless interface for allowing the processor to communicate with another device.

In another example, a method is provided which comprises: generating, by a first feedback loop, a control signal for regulating a power supply provided to a load; and receiving, by a second feedback loop which separate from the first feedback loop, the control signal from the first feedback loop, the second feedback loop to regulate the power supply provided to the load. In some embodiments, the method comprises comparing the power supply with a reference voltage. In some embodiments, the method comprises filtering output of the comparator. In some embodiments, the method comprises converting an output of the filter to the control signal.

In some embodiments, the first feedback loop is substantially a digital feedback loop. In some embodiments, the second feedback loop is an analog feedback loop. In some embodiments, the second feedback loop comprises a flipped voltage follower. In some embodiments, the method comprises controlling response time of the second feedback loop by a digital bus. In some embodiments, the control signal is received by multiple second feedback loops. In some embodiments, the method comprises compensating low-frequency current variations associated with the power supply, the low-frequency current variations generated by the load. In some embodiments, the method comprises regulating the output voltage to compensate high-frequency current variations associated with the power supply, the high-frequency current variations generated by the load.

In another example, an apparatus is provided which comprises: means for generating, by a first feedback loop, a control signal for regulating a power supply provided to a load; and means for receiving, by a second feedback loop which separate from the first feedback loop, the control signal from the first feedback loop, the second feedback loop to regulate the power supply provided to the load. In some embodiments, the apparatus comprises means for comparing the power supply with a reference voltage.

In some embodiments, the apparatus comprises means for filtering output of the comparator. In some embodiments, the apparatus comprises means for converting an output of the filter to the control signal. In some embodiments, the first feedback loop is substantially a digital feedback loop. In some embodiments, the second feedback loop is an analog feedback loop. In some embodiments, the second feedback loop comprises a flipped voltage follower. In some embodiments, the apparatus comprises means for controlling response time of the second feedback loop by a digital bus.

In some embodiments, the control signal is received by multiple second feedback loops. In some embodiments, the apparatus comprises means for compensating low-frequency current variations associated with the power supply, the low-frequency current variations generated by the load. In some embodiments, the apparatus comprises means for regulating the output voltage to compensate high-frequency current variations associated with the power supply, the high-frequency current variations generated by the load.

In another example, a system is provided which comprises: a memory; a processor coupled to the memory, the processor comprising a voltage regulator which includes an apparatus according to the apparatus described above; and a wireless interface for allowing the processor to communicate with another device.

In another example, a method is provided which comprises: providing, by a first output node, a first power supply to a first load; providing, by a second output node, a second power supply to a second load; generating, by a master loop, a control signal for regulating the first power supply provided to the first load; receiving, by a first analog loop separate from the master loop, the control signal for regulating the first power supply provided to the first load; and receiving by a second analog loop the control signal for regulating the second power supply provided to the second load.

In some embodiments, the master loop is substantially a digital feedback loop. In some embodiments, the method comprises: comparing, by a comparator, the first power supply with a reference voltage; filtering output of the comparator; and converting an output of the filter to the control signal. In some embodiments, the method comprises compensating for process and temperature variations in the first power supply. In some embodiment, the method comprises compensating low-frequency current variations in the first power supply, and wherein the first analog loop is operable to compensate for high-frequency switching noise in the first power supply. In some embodiments, the method comprises regulating the second power supply to compensate high-frequency current variations associated with the second power supply, the high-frequency current variations generated by the second load.

In another example, an apparatus is provided which comprises: means for providing, by a first output node, a first power supply to a first load; means for providing, by a second output node, a second power supply to a second load; means for generating, by a master loop, a control signal for regulating the first power supply provided to the first load; means for receiving, by a first analog loop separate from the master loop, the control signal for regulating the first power supply provided to the first load; and means for receiving by a second analog loop the control signal for regulating the second power supply provided to the second load.

In some embodiments, the master loop is substantially a digital feedback loop. In some embodiments, the apparatus comprises: means for comparing, by a comparator, the first power supply with a reference voltage; means for filtering output of the comparator; and means for converting an output of the filter to the control signal. In some embodiments, the apparatus comprises means for compensating for process and temperature variations in the first power supply. In some embodiments, the apparatus comprises means for compensating low-frequency current variations in the first power supply, and wherein the first analog loop is operable to compensate for high-frequency switching noise in the first power supply. In some embodiments, the apparatus comprises means for regulating the second power supply to compensate high-frequency current variations associated with the second power supply, the high-frequency current variations generated by the second load.

In another example, a system is provided which comprises: a memory; a processor coupled to the memory, the processor comprising a voltage regulator which includes an apparatus according to the apparatus described above; and a wireless interface for allowing the processor to communicate with another device.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

We claim:

1. An apparatus comprising:
   a first feedback loop to generate a control signal for regulating a power supply provided to a load; and
   a second feedback loop, separate from the first feedback loop, to receive the control signal from the first feedback loop, wherein the second feedback loop is to regulate the power supply provided to the load, and wherein the control signal is to bias a gate terminal of a first transistor in the first feedback loop and a gate terminal of a second transistor in a second feedback loop.

2. The apparatus of claim 1, wherein the first feedback loop comprises a comparator to compare the power supply with a reference voltage.

3. The apparatus of claim 2, wherein the first feedback loop comprises a filter to filter output of the comparator.

4. The apparatus of claim 3, wherein the first feedback loop comprises a digital-to-analog comparator (DAC) to convert an output of the filter to the control signal.

5. The apparatus of claim 1, wherein the first feedback loop is substantially a digital feedback loop.

6. The apparatus of claim 1, wherein the second feedback loop is an analog feedback loop.

7. The apparatus of claim 1, wherein the second feedback loop comprises a flipped voltage follower.

8. The apparatus of claim 1, wherein response time of the second feedback loop is controllable by a digital bus.

9. The apparatus of claim 1, wherein the control signal is received by multiple second feedback loops.

10. The apparatus of claim 1, wherein the first feedback loop is to compensate low-frequency current variations associated with the power supply, the low-frequency current variations generated by the load.

11. The apparatus of claim 1, wherein the second feedback loop is to regulate the output voltage to compensate high-frequency current variations associated with the power supply, the high-frequency current variations generated by the load.

12. The apparatus of claim 1, wherein the first feedback loop is a master loop which is to provide the control signal to a plurality of slave drivers, wherein an individual slave driver is to provide an associated power supply to a load.

13. The apparatus of claim 12, wherein the individual slave driver comprises:
    a first transistor of a first conductivity type to receive the control signal; and
    a second transistor of the first conductivity type coupled to series with the first transistor, wherein the second transistor is coupled to a supply rail.

14. The apparatus of claim 13, wherein the individual slave driver comprises:
    a third transistor of a second conductivity type coupled in series with the first transistor of the individual slave driver; and
    a fourth transistor of the first conductivity type coupled to the first transistor of the individual slave driver such that a gate terminal of the fourth transistor is coupled to one of a source or drain of the first transistor of the individual slave driver.

15. The apparatus of claim 14, wherein the individual slave driver comprises:
    a fifth transistor of the second conductivity type, wherein the fifth transistor is coupled in series with the fourth transistor, wherein the fifth transistor is controllable by a bias; and a sixth transistor of the first conductivity type, wherein the sixth transistor is coupled in series with the fourth transistor, and wherein the sixth transistor is controllable by the bias.

16. A system comprising:
a memory;
a processor coupled to the memory, the processor comprising a voltage regulator which includes:
   a first feedback loop to generate a control signal for regulating a power supply provided to a load; and
   a second feedback loop, separate from the first feedback loop, to receive the control signal from the first feedback loop, wherein the second feedback loop is to regulate the power supply provided to the load, wherein the control signal is to bias a gate terminal of a first transistor in the first feedback loop and a gate terminal of a second transistor in a second feedback loop; and
a wireless interface to allow the processor to communicate with another device.

17. The system of claim 16, wherein the first feedback loop is to compensate low-frequency current variations associated with the power supply, the low-frequency current variations generated by the load.

18. The system of claim 16, wherein the second feedback loop is to regulate the power supply to compensate high-frequency current variations associated with the power supply, high-frequency current variations generated by the load.

19. An apparatus comprising:
a package substrate;
a processing circuitry coupled to the package substrate via bumps;
a power supply circuitry coupled to the processing circuitry by through-silicon-vias (TSVs), wherein the power supply circuitry includes:
   a first feedback loop to generate a control signal for regulating a power supply provided to a load; and
   a second feedback loop, separate from the first feedback loop, to receive the control signal from the first feedback loop, wherein the second feedback loop is to regulate the power supply provided to the load, and wherein the control signal is to bias a gate terminal of a first transistor in the first feedback loop and a gate terminal of a second transistor in a second feedback loop; and
a memory coupled to the power supply circuitry and the processing circuitry.

20. The apparatus of claim 19, wherein the first feedback loop comprises:
   a comparator to compare the power supply with a reference voltage,
   a filter to filter output of the comparator,
   a digital-to-analog comparator (DAC) to convert an output of the filter to the control signal.

* * * * *